United States Patent
Arnold et al.

(10) Patent No.: US 6,438,614 B2
(45) Date of Patent: Aug. 20, 2002

(54) POLYMORPHIC TOKEN BASED CONTROL

(75) Inventors: Kenneth Arnold, Lexington; James H. Waldo, Dracut, both of MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/044,934

(22) Filed: Mar. 20, 1998

(51) Int. Cl.[7] .................. G06F 15/16; G06F 15/177
(52) U.S. Cl. .................. 709/251; 709/230; 709/221
(58) Field of Search ............... 709/200, 231, 709/225, 220, 221, 230, 228, 250, 251; 707/203; 713/200, 201, 100; 717/11

(56) References Cited

U.S. PATENT DOCUMENTS

| | | | |
|---|---|---|---|
| 4,430,699 A | * | 2/1984 | Segarra et al. ............ 709/230 |
| 4,491,946 A | | 1/1985 | Kryskow, Jr. et al. ........ 370/89 |
| 4,558,413 A | * | 12/1985 | Schmidt et al. ............ 707/203 |
| 4,713,806 A | | 12/1987 | Oberlander et al. |
| 4,809,160 A | | 2/1989 | Mahon et al. |
| 4,823,122 A | | 4/1989 | Mann et al. |
| 4,939,638 A | | 7/1990 | Stephenson et al. |
| 4,956,773 A | | 9/1990 | Saito et al. |
| 5,088,036 A | | 2/1992 | Ellis et al. ................ 395/425 |
| 5,109,486 A | | 4/1992 | Seymour |
| 5,187,787 A | | 2/1993 | Skeen et al. .............. 395/600 |
| 5,218,699 A | | 6/1993 | Brandle et al. |
| 5,257,369 A | | 10/1993 | Skeen et al. .............. 395/650 |
| 5,293,614 A | | 3/1994 | Ferguson et al. .......... 395/600 |
| 5,297,283 A | | 3/1994 | Kelly, Jr. et al. |
| 5,307,490 A | | 4/1994 | Davidson et al. |
| 5,311,591 A | | 5/1994 | Fischer |
| 5,339,435 A | | 8/1994 | Lubkin et al. |
| 5,386,568 A | | 1/1995 | Wold et al. |
| 5,390,328 A | | 2/1995 | Frey et al. |
| 5,392,280 A | * | 2/1995 | Zheng ................... 370/353 |
| 5,423,042 A | | 6/1995 | Jalili et al. |

(List continued on next page.)

FOREIGN PATENT DOCUMENTS

| | | |
|---|---|---|
| EP | 0 300 516 A | 1/1989 |
| EP | 0 351 536 A3 | 1/1990 |
| EP | 0 384 339 A | 8/1990 |
| EP | 0 472 874 A1 | 3/1992 |
| EP | 0 474 340 A | 3/1992 |
| EP | 0 497 022 A1 | 8/1992 |
| EP | 0 555 997 A2 | 2/1993 |
| EP | 0 565 849 A | 10/1993 |
| EP | 0 569 195 A2 | 11/1993 |
| EP | 0 625 750 A | 11/1994 |
| EP | 0 635 792 A | 1/1995 |

(List continued on next page.)

OTHER PUBLICATIONS

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

(List continued on next page.)

*Primary Examiner*—Zarni Maung
*Assistant Examiner*—Jason D. Cardone
(74) *Attorney, Agent, or Firm*—Finnegan, Henderson, Farabow, Garrett & Dunner, L.L.P.

(57) ABSTRACT

The protocol for controlling a network is encapsulated within the token circulated through the token ring network. Each computer in the network that receives the token examines the token and implements the network protocol specified in the token. In this manner, the protocol of the network can be easily changed, and automatically promulgated throughout the network.

22 Claims, 4 Drawing Sheets

U.S. PATENT DOCUMENTS

| | | | |
|---|---|---|---|
| 5,440,744 A | 8/1995 | Jacobson et al. | |
| 5,448,740 A | 9/1995 | Kiri et al. | |
| 5,452,459 A | 9/1995 | Drury et al. | |
| 5,455,952 A | 10/1995 | Gjovaag | |
| 5,471,629 A | 11/1995 | Risch | |
| 5,475,792 A | 12/1995 | Stanford et al. | |
| 5,475,817 A | 12/1995 | Waldo et al. | |
| 5,481,721 A | 1/1996 | Serlet et al. | |
| 5,504,921 A | 4/1996 | Dev et al. | |
| 5,511,197 A | 4/1996 | Hill et al. | |
| 5,524,244 A | 6/1996 | Robinson et al. | |
| 5,548,726 A | 8/1996 | Pettus | |
| 5,553,282 A | 9/1996 | Parrish et al. | |
| 5,555,367 A | 9/1996 | Premerlani et al. | |
| 5,555,427 A | 9/1996 | Aoe et al. | |
| 5,557,798 A | 9/1996 | Skeen et al. | 395/650 |
| 5,560,003 A | 9/1996 | Nilsen et al. | 395/600 |
| 5,561,785 A | 10/1996 | Blandy et al. | 395/497.01 |
| 5,577,231 A | 11/1996 | Scalzi et al. | |
| 5,594,921 A | 1/1997 | Pettus | |
| 5,603,031 A | 2/1997 | White et al. | 395/683 |
| 5,617,537 A | 4/1997 | Yamada et al. | |
| 5,628,005 A | 5/1997 | Hurvig | |
| 5,640,564 A | 6/1997 | Hamilton et al. | |
| 5,644,768 A | 7/1997 | Periwal et al. | |
| 5,652,888 A | 7/1997 | Burgess | |
| 5,655,148 A | 8/1997 | Richman et al. | 395/828 |
| 5,659,751 A | 8/1997 | Heninger | 395/685 |
| 5,671,225 A | 9/1997 | Hooper et al. | |
| 5,675,796 A | 10/1997 | Hodges et al. | |
| 5,680,573 A | 10/1997 | Robin et al. | |
| 5,680,617 A | 10/1997 | Gough et al. | |
| 5,684,955 A | 11/1997 | Meyer et al. | |
| 5,689,709 A | 11/1997 | Corbett et al. | |
| 5,706,435 A | 1/1998 | Barbará et al. | |
| 5,706,502 A | 1/1998 | Foley et al. | |
| 5,724,588 A | 3/1998 | Hill et al. | |
| 5,727,145 A | 3/1998 | Nessett et al. | |
| 5,737,607 A | 4/1998 | Hamilton et al. | |
| 5,745,678 A | 4/1998 | Herzberg et al. | |
| 5,745,695 A | 4/1998 | Gilchrist et al. | |
| 5,745,703 A | 4/1998 | Cejtin et al. | |
| 5,745,755 A | 4/1998 | Covey | |
| 5,748,897 A | 5/1998 | Katiyar | |
| 5,754,849 A | 5/1998 | Dyer et al. | |
| 5,757,925 A | 5/1998 | Faybishenko | |
| 5,758,344 A | 5/1998 | Prasad et al. | |
| 5,761,656 A | 6/1998 | Ben-Schachar | |
| 5,764,897 A | 6/1998 | Khalidi | |
| 5,768,532 A | 6/1998 | Megerian | |
| 5,774,551 A | 6/1998 | Wu et al. | |
| 5,778,187 A | 7/1998 | Monteiro et al. | |
| 5,778,228 A | 7/1998 | Wei | |
| 5,778,368 A | 7/1998 | Hogan et al. | |
| 5,784,560 A | 7/1998 | Kingdon et al. | |
| 5,787,425 A | 7/1998 | Bigus | |
| 5,787,431 A | 7/1998 | Shaughnessy | |
| 5,790,548 A | 8/1998 | Sistanizadeh et al. | |
| 5,802,367 A | 9/1998 | Held et al. | |
| 5,808,911 A | 9/1998 | Tucker et al. | |
| 5,809,507 A | 9/1998 | Cavanaugh, III | |
| 5,812,819 A | 9/1998 | Rodwin et al. | |
| 5,813,013 A | 9/1998 | Shakib et al. | |
| 5,815,149 A | 9/1998 | Mutschler, III et al. | |
| 5,815,709 A | 9/1998 | Waldo et al. | |
| 5,815,711 A | 9/1998 | Sakamoto et al. | |
| 5,818,448 A | 10/1998 | Katiyar | |
| 5,829,022 A | 10/1998 | Watanabe et al. | |
| 5,832,219 A | 11/1998 | Pettus | |
| 5,832,529 A | 11/1998 | Wollrath et al. | |
| 5,832,593 A | 11/1998 | Wurst et al. | |
| 5,835,737 A | 11/1998 | Sand et al. | |
| 5,842,018 A | 11/1998 | Atkinson et al. | |
| 5,844,553 A | 12/1998 | Hao et al. | |
| 5,845,090 A * | 12/1998 | Collins, III et al. | 709/221 |
| 5,845,129 A | 12/1998 | Wendorf et al. | |
| 5,860,004 A | 1/1999 | Fowlow et al. | |
| 5,860,153 A | 1/1999 | Matena et al. | |
| 5,864,862 A | 1/1999 | Kriens et al. | |
| 5,864,866 A | 1/1999 | Henckel et al. | |
| 5,872,928 A | 2/1999 | Lewis et al. | |
| 5,872,973 A | 2/1999 | Mitchell et al. | |
| 5,875,335 A | 2/1999 | Beard | |
| 5,878,411 A | 3/1999 | Burroughs et al. | |
| 5,884,024 A | 3/1999 | Lim et al. | |
| 5,884,079 A | 3/1999 | Furusawa | |
| 5,887,134 A | 3/1999 | Ebrahim | |
| 5,889,951 A | 3/1999 | Lombardi | |
| 5,890,158 A | 3/1999 | House et al. | |
| 5,892,904 A | 4/1999 | Atkinson et al. | |
| 5,913,029 A | 6/1999 | Shostak | |
| 5,933,497 A | 8/1999 | Beetcher et al. | |
| 5,933,647 A * | 8/1999 | Aronberg et al. | 717/11 |
| 5,935,249 A | 8/1999 | Stern et al. | |
| 5,940,827 A | 8/1999 | Hapner et al. | |
| 5,944,793 A | 8/1999 | Islam et al. | |
| 5,946,485 A | 8/1999 | Weeren et al. | |
| 5,946,694 A | 8/1999 | Copeland et al. | |
| 5,949,998 A | 9/1999 | Fowlow et al. | |
| 5,951,652 A * | 9/1999 | Ingrassia, Jr. et al. | 709/248 |
| 5,956,509 A | 9/1999 | Kevner | |
| 5,963,947 A | 10/1999 | Ford et al. | |
| 5,966,531 A | 10/1999 | Skeen et al. | |
| 5,969,967 A | 10/1999 | Aahlad et al. | |
| 5,974,201 A * | 10/1999 | Chang et al. | 382/305 |
| 5,978,484 A | 11/1999 | Apperson et al. | |
| 5,987,506 A | 11/1999 | Carter et al. | |
| 5,999,179 A | 12/1999 | Kekic et al. | |
| 5,999,988 A * | 12/1999 | Pelegri-Llopart et al. | 709/330 |
| 6,003,763 A | 12/1999 | Gallagher et al. | |
| 6,009,103 A | 12/1999 | Woundy | |
| 6,016,496 A | 1/2000 | Roberson | |
| 6,023,586 A | 2/2000 | Gaisford et al. | |
| 6,026,414 A | 2/2000 | Anglin | |
| 6,031,977 A | 2/2000 | Pettus | |
| 6,052,761 A * | 4/2000 | Hornung et al. | 711/141 |
| 6,058,383 A | 5/2000 | Narasimhalu et al. | |
| 6,061,699 A | 5/2000 | DiCecco et al. | |
| 6,061,713 A | 5/2000 | Bharadhwaj | |
| 6,067,575 A | 5/2000 | McManis et al. | |
| 6,085,255 A * | 7/2000 | Vincent et al. | 709/238 |
| 6,108,346 A * | 8/2000 | Doucette et al. | 370/450 |
| 6,185,602 B1 * | 2/2001 | Bayrakeri | 709/204 |
| 6,185,611 B1 * | 2/2001 | Waldo et al. | 709/221 |
| 6,216,138 B1 | 4/2001 | Wells et al. | |
| 6,226,746 B1 * | 5/2001 | Scheifler | 413/200 |
| 6,230,160 B1 * | 5/2001 | Chan et al. | 707/103 |
| 6,247,091 B1 * | 6/2001 | Lovett | 710/260 |
| 6,263,379 B1 | 7/2001 | Atkinson et al. | 709/332 |
| 6,282,295 B1 | 8/2001 | Young et al. | |
| 6,282,568 B1 * | 8/2001 | Sondur et al. | 709/223 |

FOREIGN PATENT DOCUMENTS

| | | |
|---|---|---|
| EP | 0 651 328 A | 5/1995 |
| EP | 0 660 231 A | 6/1995 |
| EP | 0 697 655 A2 | 2/1996 |
| EP | 0 718 761 A | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |

| | | |
|---|---|---|
| EP | 0 803 811 A | 10/1997 |
| EP | 0 805 393 A2 | 11/1997 |
| EP | 0 810 524 A | 12/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/3692 A | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gray et al., "Leases: An Efficient Fault–Tolerant Mechanism for Distributed File Cache Consistency," Proceedings of the 12th ACM Symposium on Operating Systems Principles, pp. 202–210, 1989.

Guyenne et al., "A New Consistency Protocol Implemented in the CAlif System," IEEE, 1094–7256/97, pp. 82–87, 1997.

Guyennet et al., "Distributed Shared memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

Venners, "Jini Technology, Out of the Box," JAVAWORLD, 'Online!, pp. 1–4, Dec. 1998.

Alexander, et al., "Active Bridging", Proceedings of the ACM/SIGCOMM'97 Conference, Cannes, France, 9/97.

Anonymous: "Change–Notification Service for Shared Files", IBM Technical Disclosure Bulletin, vol. 36, No. 8, pp. 77–82, Aug. 1993, XP002108713, New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing", Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192, Jan. 1989.

Birrell et al., "Implementing Remote Procedure Calls", ACM Transactions on Computer Systems, vol. 2, No. 1, Feb. 1984, pp. 39–59.

Dave A et al: "Proxies, Application Interface, And Distributed Systems", Proceedings International Workshop On Object Orientation In Operating Systems, Sep. 24, 1992, pp. 212–220.

Deux O et al: "The 02 System" Communications Of The Association For Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO–STATE.EDU/HTBIN/RFC/RFC1541.HTML, Oct. 1993, pp. 1–33.

Emms J: "A Definition Of An Access Control Systems Language" Computer Standards And Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", HTTP://WWW.SUNWORLD.COM/SWOL–02–1998/SWOL–02–SUNSPOTS.HTML; XP–002109935, P.1, Feb. 20, 1998.

Hamilton et al., "Subcontract: a flexible base for distributed programming"; Proceedings of the 14th Symposium of Operating System Principles; (Dec. 1993).

Hartman, J., Manber, U., et al., Liquid Software: A New Paradigm for Networked Systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994 (1994–10), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification," Sun Microsystems, Inc., Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Waldo J et al: "Events in an RPC based distributed system" Proceedings Of The 1995 Usenix Technical Conference, Proceedings Usenix Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type System for an Object–Oriented Database System," Proceedings of the International Computer Software and Applications Conference (COMPSAC), pp. 333–338, Sep. 11–13, 1991, Tokyo, Japan.

Yin, J. et al., 18$^{th}$ International Conference on Distributed Computing Systems, "Using Leases to Support Server Driven Consistency in Large–Scale Systems," Computer Services Department, University of Texas at Austin, pp. 285–294 (May 26–29, 1998).

Yechiam Yemini & Sushil da Silva, "Towards Programmable Networks," IFIP/IEEE International Workshop on Distributed Systems: Operations and Management, pp. 1–11, Oct. 1996.

John Hartman et al., "Liquid Software: A New Paradigm for Networked Systems," Technical Report 96–11, Department of Computer Science, University of Arizona, pp. 1–13, Jun. 1996.

D.Scott Alexander et al., "Active Bridging," Proceedings of the ACM/SIGCOMM '97 Conference, Sep. 1997.

Mullender, *Distributed Systems*, Second Edition, Addison-–Wesley, 1993.

Howard et al., *Scale and Performance in a Distributed File System*, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, *Self–stabilizing Systems in Spite of Distributed Control*, Communications of the ACM, vol. 17, No. 11, Nov. 1974, pp. 643–644.

Ousterhout et al., *The Sprite Network Operating System*, Computer, IEEE, Feb. 1988, pp. 23–36.

Dourish, *A Divergence–Based Model of Synchrony and Distribution in Collaborative Systems*, Xerox Technical Report EPC–1194–102, 1994, pp. 1–10.

Sharrott et al., *ObjectMap: Integrating High Performance Resources into a Distributed Object–oriented Environment*, ICODP, 1995.

Birrell et al., *Grapevine: An Exercise in Distributed Computing*, Communications of the ACM, vol. 25, No. 4, Apr. 1982, pp. 260–274.

*Transparent Network Computing*, Locus Computing Corporation, Jan. 5, 1995.

Gray et al., *Leases: An Efficient Fault–Tolerant Mechanism for Distributed File Cache Consistency*, ACM, 1989, pp. 202–210.

Lamport et al., *The Byzantine Generals Problem*, ACM Transactions on Programming Languages and Systems, vol. 4, No. 3, Jul. 1982, pp. 382–401.

Dolev et al., *On the Minimal Synchronism Needed for Distributed Consensus*, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Cannon et al., *Adding Fault–Tolerant Transaction Processing to LINDA*, Software–Practice and Experience, vol. 24(5), May 1994, pp. 449–466.

Kambhatla et al., *Recovery with Limited Replay: Fault–Tolerant Processes in Linda*, Oregon Graduate Institute, Technical Report CSIE 90–019, Sep. 1990, pp. 1–16.

Anderson et al., *Persistent Linda: Linda + Transactions + Query Processing*, Proceedings of the 13th Symposium on Fault Tolerant Systems, 1994, pp. 93–109.

Gelernter, *Generative Communication in Linda*, ACM Transactions on Programming Languages and Systems, vol. 7, No. 1, Jan. 1985, pp. 80–112.

Carriero et al., *Distributed Data Structures in Linda*, Principals of Programming Language, 1986, pp. 1–16.

Pinakis, *Using Linda as the Basis of an Operating System Microkernel*, University of Western Australia, Department of Computer Science, Aug. 1993, pp. 1–165.

LINDA Database Search, Jul. 20, 1995, pp. 1–68.

Carriero et al, *Distributed Data Structures in Linda*, Yale Research Report YALEU/DCS/RR–438, Nov. 1985.

Agha et al., *Actorspaces: An Open Distributed Programming Paradigm*, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, pp. 12.

Coulouris et al., *Distributed Systems Concepts and Designs*, Second Edition, Addison–Wesley, 1994.

Birrell et al., *Network Objects*, DEC SRC Research Report 115, Feb. 28, 1994.

Birrell et al., *Distributed Garbage Collection for Network Objects*, DEC SRC Research Report 116, Dec. 15, 1993.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Hamilton, *Java and the Shift to Net–Centric Computing* Computer, Aug. 1996, pp. 31–39.

Chung et al., *A 'Tiny' Pascal Compiler: Part 1: The P–Code Interpreter*, BYTE Publications, Inc., Sep. 1978.

Chung et al., *A 'Tiny' Pascal Compiler: Part 2: The P–Compiler*, BYTE Publications, Inc., Oct. 1978.

Thompson, *Regular Expression Search Algorithm*, Communications of the ACM, vol. II, No. 6, p. 149 et seq., Jun. 1968.

Mitchell et al., *Mesa Language Manual*, Xerox Corporation.

McDaniel, *An Analysis of a Mesa Instruction Set*, Xerox Corporation, May 1982.

Pier, *A Retrospective on the Dorado, A High–Performance Personal Computer*, Xerox Corporation, Aug. 1983.

Pier, *A Retrospective on the Dorado, A High–Performance Personal Computer*, IEEE Conference Proceedings, The 10th Annual international Symposium on Computer Architecture, 1983.

Krasner, *The Smalltalk–80 Virtual Machine*, BYTE Publications Inc., Aug. 1991, pp. 300–320.

*Operating Systems Review*, ACM Press, vol. 27, No. 5, Dec. 1993, pp. 217–230.

*Remote Method Invocation Specification*, Sun Microsystems, Inc., (1997), http://java.sun.com/products/jdk/1.1/docs/guide/rmi/spec/rmiTOC.doc.html.

Stevenson et al., "Token–based Consistency of Replicated Servers", IEEE, 1989.*

Guyennet et al., "Distribution Shared Memory Layer for Cooperative Work Applications", IEEE, 1997.*

Guyennet et al., "A New Consistency Protocol Implemented in the CALiF System", IEEE, 1997.*

Douglas Hodges, "Managing Object Lifetimes in OLE," http://www.scit.wlv.ac.uk, pp.1–41, Aug. 25, 1994.

* cited by examiner

POLYMORPHIC TOKEN BASED CONTROL

RELATED APPLICATIONS

The following identified U.S. patent applications are relied upon and are incorporated by reference in this application.

Provisional U.S. Patent Application No. 60/076,048, entitled "Distributed Computing System," filed on Feb. 26, 1998.

U.S. patent application Ser. No. 09/044,923, entitled "Method and System for Leasing Storage" and filed on the same date herewith.

U.S. patent application Ser. No. 09/044,838, entitled "Method, Apparatus, and Product for Leasing of Delegation Certificates in a Distributed System" and filed on the same date herewith.

U.S. patent application Ser. No. 09/044,834, entitled "Method, Apparatus and Product for Leasing of Group Membership in a Distributed System" and filed on the same date herewith.

U.S. patent application Ser. No. 09/044,916, entitled "Leasing for Failure Detection" and filed on the same date herewith.

U.S. patent application Ser. No. 09/044,933, entitled "Method for Transporting Behavior in Event Based System" and filed on the same date herewith.

U.S. patent application Ser. No. 09/044,919, entitled "Deferred Reconstruction of Objects and Remote Loading for Event Notification in a Distributed System" and filed on the same date herewith.

U.S. patent application Ser. No. 09/044,938, entitled "Method and Apparatus for Remote Method Invocation" and filed on the same date herewith.

U.S. patent application Ser. No. 09/045,652, entitled "Method and System for Deterministic Hashes to Identify Remote Methods" and filed on the same date herewith.

U.S. patent application Ser. No. 09/044,790, entitled "Method and Apparatus for Determining Status of Remote Objects in a Distributed System" and filed on the same date herewith.

U.S. patent application Ser. No. 09/044,930, entitled "Downloadable Smart Proxies for Performing Processing Associated with a Remote Procedure Call in a Distributed System" and filed on the same date herewith.

U.S. patent application Ser. No. 09/044,917, entitled "Suspension and Continuation of Remote Methods" and filed on the same date herewith.

U.S. patent application Ser. No. 09/044,835, entitled "Method and System for Multi-Entry and Multi-Template Matching in a Database" and filed on the same date herewith.

U.S. patent application Ser. No. 09/044,839, entitled "Method and System for In-Place Modifications in a Database" and filed on the same date herewith.

U.S. patent application Ser. No. 09/044,945, entitled "Method and System for Typesafe Attribute Matching in a Database" and filed on the same date herewith.

U.S. patent application Ser. No. 09/044,931, entitled "Dynamic Lookup Service in a Distributed System" and filed on the same date herewith.

U.S. patent application Ser. No. 09/044,939, entitled "Apparatus and Method for Providing Downloadable Code for Use in Communicating with a Device in a Distributed System" and filed on the same date herewith.

U.S. patent application Ser. No. 09/044,826, entitled "Method and System for Facilitating Access to a Lookup Service" and filed on the same date herewith.

U.S. patent application Ser. No. 09/044,932, entitled "Apparatus and Method for Dynamically Verifying Information in a Distributed System" and filed on the same date herewith.

U.S. patent application Ser. No. 09/030,840, entitled "Method and Apparatus for Dynamic Distributed Computing Over a Network" and filed on Feb. 26, 1998.

U.S. patent application Ser. No. 09/044,936, entitled "An Interactive Design Tool for Persistent Shared Memory Spaces" and filed on the same date herewith.

U.S. patent application Ser. No. 09/044,915, entitled "Stack-Based Access Control" and filed on the same date herewith.

U.S. patent application Ser. No. 09/044,944, entitled "Stack-Based Security Requirements" and filed on the same date herewith.

U.S. patent application Ser. No. 09/044,837, entitled "Per-Method Designation of Security Requirements" and filed on the same date herewith.

FIELD OF THE INVENTION

This invention relates generally to local area networks and, more specifically, to token passing in a token ring local area network.

BACKGROUND OF THE INVENTION

Computers in a computer network often share a limited number of resources. One conventional method of allocating access between shared resources involves passing a "token" circularly to each computer in the network. The computers agree ahead of time that when using this token protocol, only the computer that has possession of the token may access the resource. A popular example of a network using a token passing algorithm is a token ring network.

Token ring networks are baseband networks, which means that all the transmission capacity (i.e., network bandwidth) of the network media is used by one signal. Because only one signal at a time can be transmitted over the network, multiple computers in a token ring network must not transmit simultaneously. This is accomplished using a token access protocol.

In the token access protocol, computers in the network agree to continuously circulate an information frame to all the computers in the network. When a computer wants to send a message, it waits until it possesses the empty frame, and then modifies the frame by inserting: its message, a destination identifier, and a "token." The token may simply be, for example, a bit field in the frame that the inserting computer changes to a 1 to indicate a token is present or a 0 to indicate an empty frame.

The frame is examined by each computer as it is passed around the network. The destination computer copies the message from the frame and changes the token back to zero. The originating computer, when it receives the frame, can verify that its message was received by noticing that the token has been set to zero. The originator then removes the message from the frame and passes the empty frame to the next computer in the network.

Although conventional token ring networks are effective at preventing data collisions, they have disadvantages. In particular, in order to implement a token ring network, all the computers in the network must agree ahead of time on the appropriate protocol to use in passing the message frame. This can be difficult, if, for example, the network administrator wishes to change the protocol of the token ring, as each computer must be updated before the network is operational. It is therefore desirable to improve token ring networks.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect consistent with the present invention includes a method of updating a protocol for controlling a computer network including a plurality of computers, the method comprises the steps of: (1) creating a token object containing methods defining an updated version of the protocol; (2) sequentially passing the token object to each computer in the network; and (3) updating the protocol used by each of the plurality of computers with the methods defining the updated version of the protocol while the token object is present at each computer.

A second aspect consistent with the present invention is directed to a token ring network. The network comprises a plurality of computers coupled together and a token ring object. The token ring object includes methods and data that define a protocol for the token ring network, the token ring object is sequentially transferred to each of the plurality of computers, and when one of the plurality of computers has received possession of the token ring object, it adopts the protocol defined by the token ring object when the protocol defined by the token ring object is different than the protocol in use by the computer.

Further, a third aspect consistent with the present invention includes a method of updating a protocol for controlling a computer network. The method includes the steps of: (1) receiving a token object at a first computer in the network; (2) consulting the token object, and when the token object indicates that a new protocol is to be used to transmit information on the network, updating an older version of the protocol stored at the first computer; and (3) transmitting the token object to a second computer in the network, the second computer being determined based on information in the token object.

Further, an additional aspect consistent with the present invention includes a method of updating a protocol for controlling a computer network. The method includes the steps of: (1) receiving a token object defining a protocol of the network; and (2) sending the object using the protocol defined in the token object.

Still further, an additional aspect consistent with the present invention includes a computer readable memory device containing token including an indication of a protocol to be used when communicating in a network.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

DETAILED DESCRIPTION

A token ring network is disclosed in which tokens passed between computers in the network define a protocol, or at least a portion of the protocol, for the token ring network. Each computer in the network that receives the token examines the token and implements the network protocol specified in the token. Any computer having appropriate permission may change or update the protocol in the token, and thereby change the protocol for the entire network.

Reference will now be made in detail to the embodiments of the invention, examples of which are illustrated in the accompanying drawings.

System Overview

Figure 1:
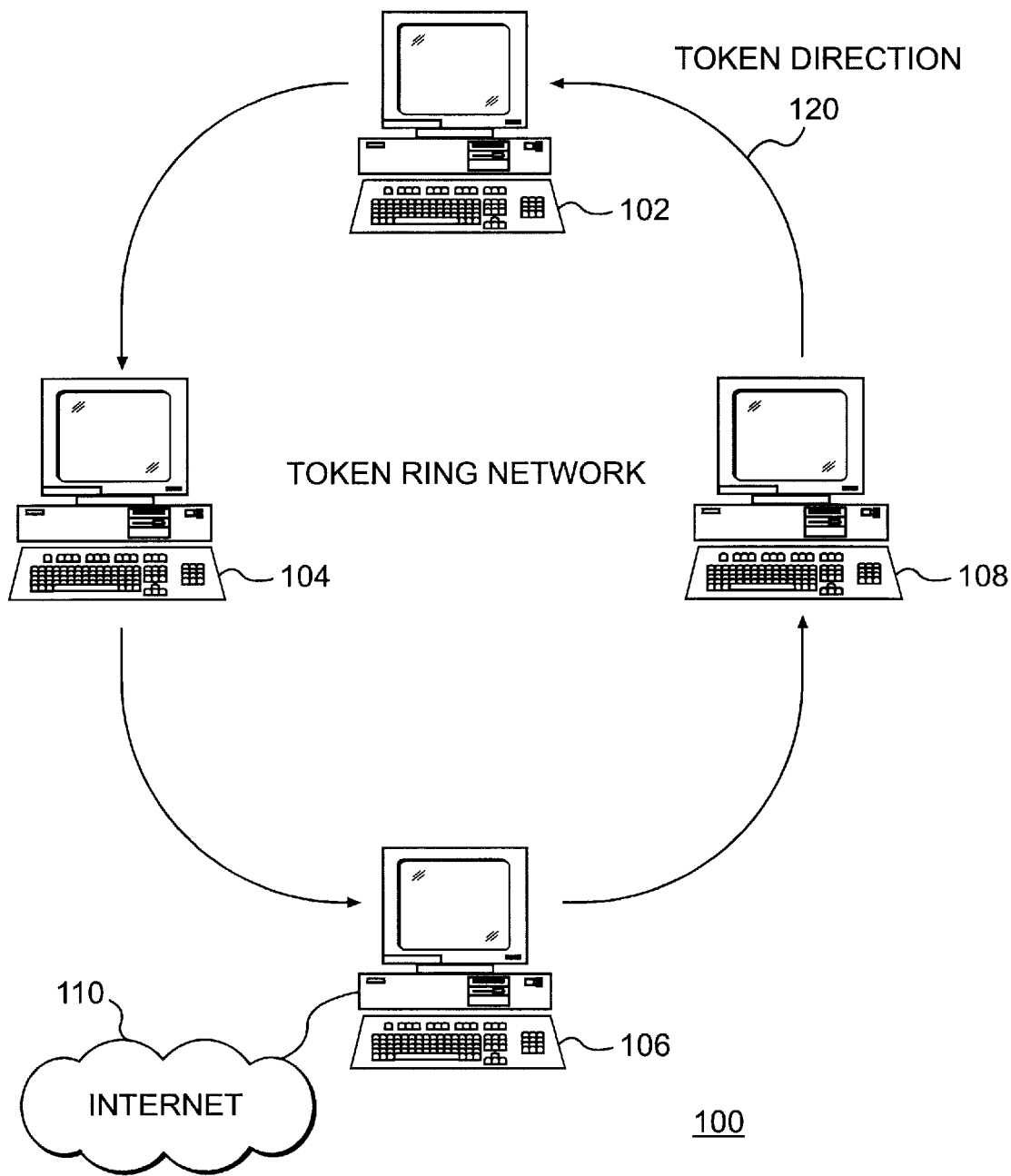
FIG. 1 is a high-level diagram of a token ring network.

FIG. 1 is a high level diagram of a token ring network 100 made up of four distributed computers 102, 104, 106, and 108 passing a token object in the counter clockwise direction through network media 120. The token object is preferably passed between computers 102–108 using some form of remote object passing mechanism, such as the Java remote invocation system (Java RMI). Additionally, one of computers 102–108 may act as a gateway to a larger token ring network or to a non token ring network. As shown in FIG. 1, computer 106 acts as a gateway to the Internet network 110.

In exemplary distributed system 100, different computers and devices are federated into what appears to the user to be a single system. By appearing as a single system, the distributed system 100 provides the simplicity of access and the power of sharing that can be provided by a single system without giving up the flexibility and personalized response of a personal computer or workstation. Distributed system 100 may contain thousands of devices operated by users who are geographically disperse, but who agree on basic notions of trust, administration, and policy.

Within the distributed 100 system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

The Java RMI and its relationship with computers 102–108 and token ring network 100 will now briefly be described with reference to FIG. 2.

Figure 2:
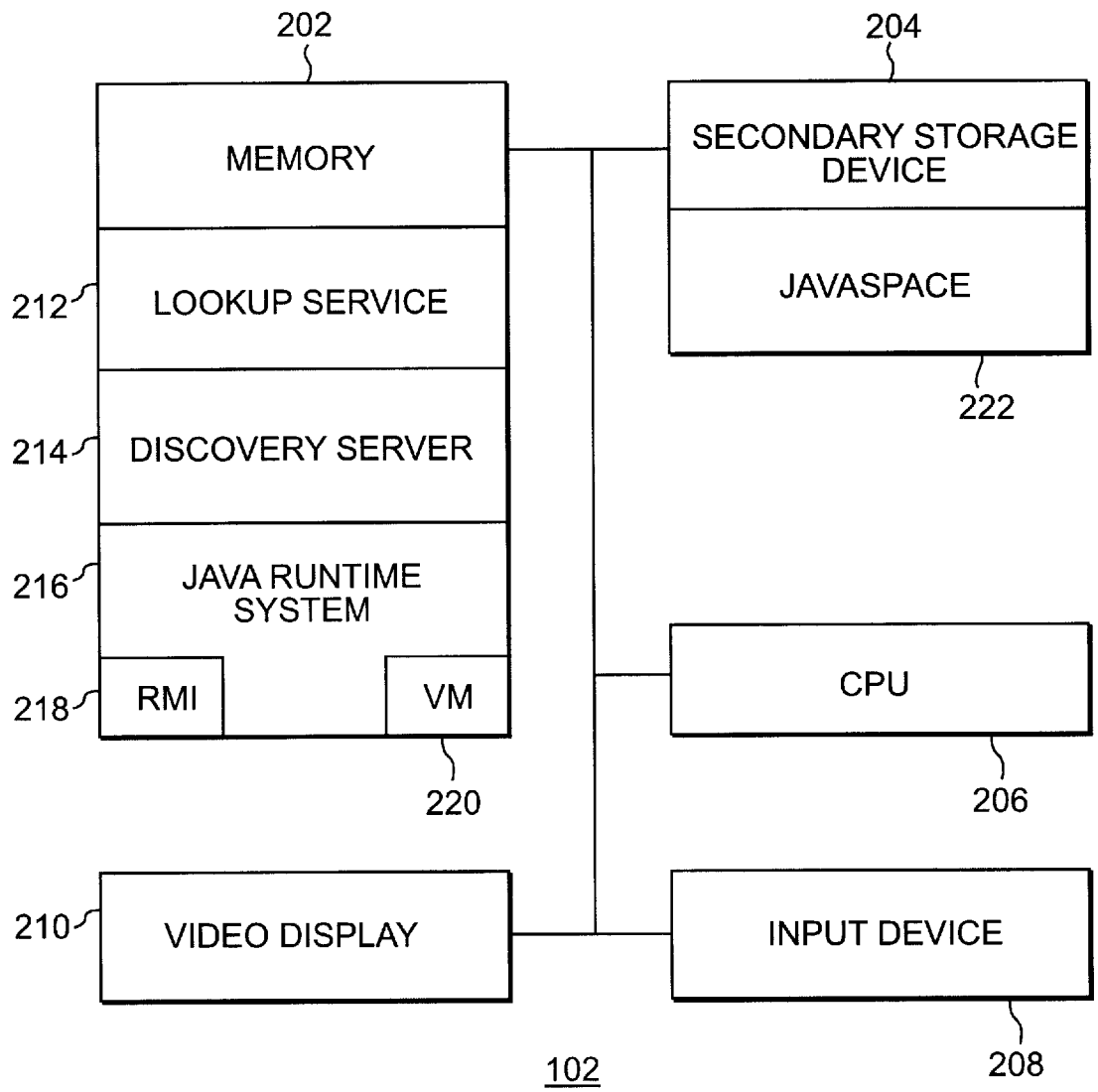
FIG. 2 is a block diagram illustrating an exemplary embodiment of a computer used in the token ring network.

FIG. 2 depicts computer 102 in greater detail showing a number of the software components of the distributed system 100. Computer 102 includes a memory 202, a secondary storage device 204, a central processing unit (CPU) 206, an input device 208, and a video display 210. The memory 202 includes a lookup service 212, a discovery server 214, and a Java™ runtime system 216. The Java runtime system 216 includes the Java™ remote method invocation system (RMI) 218 and a Java™ virtual machine 220. The secondary storage device 204 includes a JavaSpace™ 222.

The exemplary distributed system 100 is based on the Java programming environment and thus makes use of the Java runtime system 216. The Java runtime system 216 includes the Java API, allowing programs running on top of the Java runtime system to access, in a platform-independent manner, various system functions, including windowing capabilities and networking capabilities of the host operating system. Since the Java API provides a single common API across all operating systems to which the Java runtime system is ported, the programs running on top of a Java runtime system run in a platform-independent manner, regardless of the operating system or hardware configuration of the host platform. The Java runtime system 216 is provided as part of the Java software development kit available from Sun Microsystems of Mountain View, Calif.

The Java virtual machine 220 also facilitates platform independence. The Java virtual machine 220 acts like an abstract computing machine receiving instructions from programs in the form of byte codes and interpreting these byte codes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044,826, entitled "Method and System for Facilitating Access to a Lookup Service" which has been previously incorporated by reference.

The discovery server 214 detects when a new device is added to the exemplary distributed system 100, during a process known as boot and join or discovery, and when such a new device is detected the discovery server passes a reference to the lookup service 212 to the new device so that the new device may register its services with the lookup service and become a member of the Djinn. After registration, the new device becomes a member of the Djinn, and as a result, it may access all the services contained in the lookup service 212. The process of boot and join is described in greater detail in co-pending U.S. patent application Ser. No. 09/044,939, entitled "Apparatus and Method for Providing Downloadable Code for Use in Communicating with a Device in a Distributed System," which has previously been incorporated by reference.

The JavaSpace 222 is an object repository used by programs within the exemplary distributed system 100 to store objects. Programs use the JavaSpace 222 to store objects persistently as well as to make them accessible to other devices within the exemplary distributed system. Java spaces are described in greater detail in co-pending U.S. patent application No. 08/971,529, entitled "Database System Employing Polymorphic Entry and Entry Matching" assigned to a common assignee, filed on Nov. 17, 1997, which is incorporated herein by reference. One skilled in the art will appreciate that the exemplary distributed system 100 may contain many lookup services, discovery servers, and JavaSpaces.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the SunLogo, Java, and Java-based trademarks are trademarks or registered trademarks of Sun Microsystems Inc. in the United States and other countries.

Polymorphic Token Passing

A token ring network consistent with the present invention passes a polymorphic token object around the network in place of the static token frame used in conventional token ring networks. The passing of the token object is preferably implemented using a distributed object-oriented programming environment, such as Java RMI (described above). Java RMI is especially suitable to the present invention, as it provides for the automatic management of distributed objects and the ability to easily pass objects from machine to machine on a network.

Figure 3:
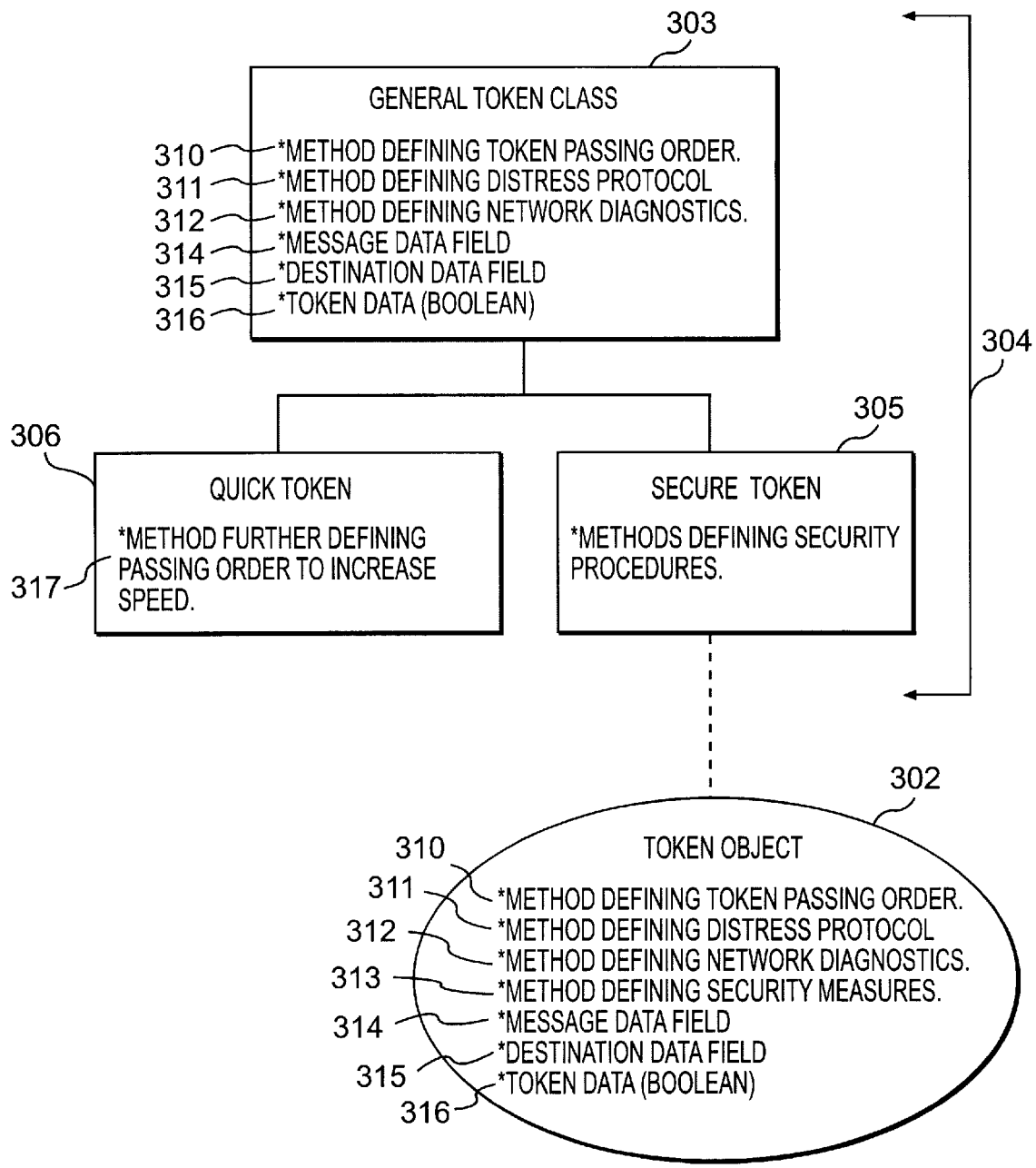
FIG. 3 is a diagram illustrating an embodiment of a token object consistent with the present invention.

FIG. 3 is a diagram illustrating an exemplary token 302 and its relationship with a token class hierarchy 304. Token 302 is preferably implemented using an object data structure, and as such, may include functionality (e.g., methods) and data. As used throughout this specification, and as generally used in the in object-oriented programming field, a class refers to a template from which objects may be defined. An object is an instance of a particular class and can include attribute information that distinguishes objects of the same class. Objects inherit behavior from the class they depend from. Token object 302, for example, is an instance of, and inherits behavior from, "secure token" class 305, which in turn inherits behavior from "general token" class 303.

As shown, token object 302 includes method(s) 310 defining the token passing order in the network (e.g., counter clock-wise), method(s) 311 defining a distress protocol to be used by a malfunctioning computer, method(s) 312 defining network diagnostic checking routines, and method(s) 313 defining security measures to be implemented by the network. In the context of conventional token ring networks, token ring protocols that implement the functionality defined by methods 310–313 are well known, and accordingly, a detailed description of these methods is omitted.

Token 302 also includes a message data field 314, a destination data field 315, and a token data field 316, each of which is directly analogous to the message, message identifier, and token described above regarding the conventional token ring network frame.

Token class 303 defines the general functionality required by a "token." Classes and objects defined from the general class 303 inherit this functionality. As shown, token class 303 implements, or partially implements, methods 310–312 and fields 314–316. Secure token class 305 is a subclass of class 303, and as such, class 305 inherits the functionality of class 303. Additionally, subclass 305 may define its own methods and variables, including, for example, method(s) 313 defining network security measures. Quick token 306 is also a subclass of class 303. Quick token 303 may include, for example, method(s) 317 that further define the passing order defined in method(s) 310.

In operation, each computer in network 100 examines the token object it receives and, based on this examination, modifies the protocol it uses to implement the token ring network. If a computer wishes to change the token network protocol of the network, the computer simply changes methods in the token object by either updating, overriding, or adding a new method. As the token object propagates through the network, the new protocol is implemented.

Figure 4:
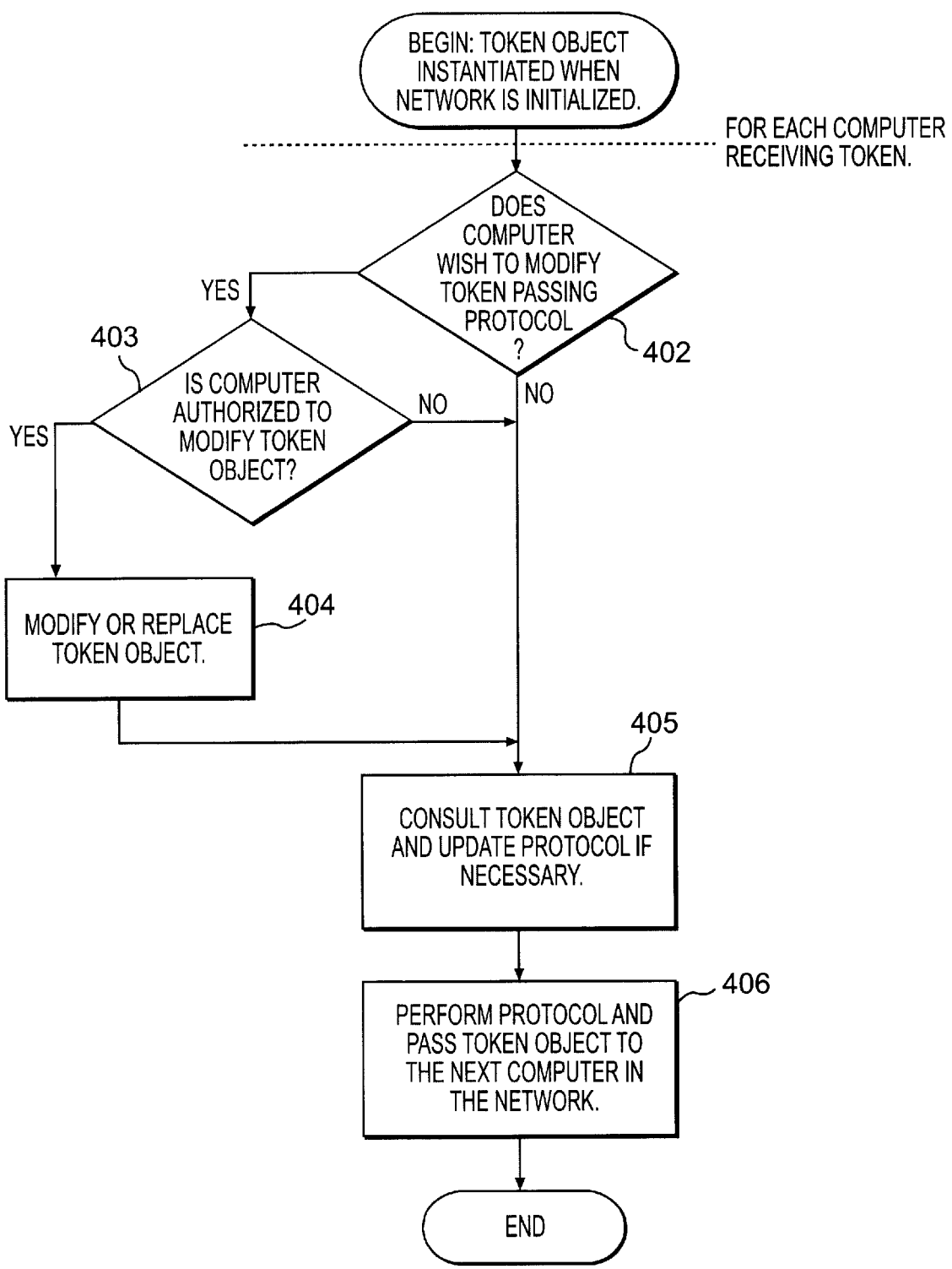
FIG. 4 is a flow chart illustrating methods consistent with the present invention.

FIG. 4 is a flow chart illustrating methods consistent with the present invention. Preferably, to ensure network integrity, only authorized computers should be able to modify the token ring network protocol. If a computer wishes to modify the protocol, (step 402), and it has appropriate authority, (step 403), it modifies the protocol simply by adding or substituting, when it has control of the token object, its new methods that define the token ring protocol (step 404). Whether a computer has authorization to modify the network protocol may be indicated by, for example, a field in the token, or pre-hardwired into the computers in network 100.

Each computer in network 100 that receives the token object consults the token object and, if necessary, updates its version of the network protocol (step 405). The computer may then appropriately operate on the token and pass the token to the next computer in the network (step 406).

As an illustration of the method shown in FIG. 4, assume a computer would like to change the present token object, which is an instance of secure token class 305, to a quick token object, which is an instance of class 306. Assuming the computer was authorized to change the token object, it would wait until it receives the secure token object, substitute the secure token object with the quick token object, consult the quick token object for the appropriate protocol, and then pass the quick token object to the next computer in the network.

While there has been illustrated and described what are at present considered to be preferred embodiments and methods of the present invention, it will be understood by those skilled in the art that various changes and modifications may be made, and equivalents may be substituted for elements thereof without departing from the true scope of the invention. For example, while the foregoing systems and methods have been described with reference to a Java-based, runtime environment, other run-time environments could conceivably be used to implement the present invention. Further, although the above-discussed embodiment was discussed in the context of a token ring network, one of ordinary skill in the art will appreciate that token objects consistent with the present invention could be applied equally as well to any token passing algorithm used by a network.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed:

1. A method of updating a resource allocation protocol for controlling a computer network including a plurality of computers, the method comprising the steps of:
   creating a token object containing a method defining an updated version of the protocol;
   sequentially passing the token object to each computer in the network to facilitate communication between the computers; and
   updating the protocol used by each of said plurality of computers with the method defining the updated version of the protocol while the token object is present at one of the computers.

2. The method of claim 1, wherein the step of sequentially passing the token object includes the substep of transmitting a token object defined with the Java programming language.

3. The method of claim 2, wherein the step of sequentially passing the token object further includes the substep of transmitting the token object using the Java remote invocation system.

4. The method of claim 1, wherein the step of sequentially passing the token object to each computer in the network includes the substep of introducing the token object into the network by an authorized computer when the authorized computer is given control of a previous version of the token object.

5. The method of claim 1, wherein the protocol carried out by the plurality of computers in the network implements a token ring computer network.

6. The method of claim 1, wherein the step of creating the token object containing methods defining an updated version of the protocol further includes the substep of defining a new token passing order for the network.

7. A token ring network comprising:
   a token ring object including methods and data that define a protocol for the token ring network,
   a plurality of interconnected computers; and
   the token ring object being sequentially transferred to each of the plurality of computers to facilitate communication between the plurality of computers, and when one of said plurality of computers has received possession of the token ring object, adopting the protocol defined by the token ring object when the protocol defined by the token ring object is different than the protocol in use by the computer.

8. The network of claim 7, wherein each of said plurality of computers further includes a remote object passing mechanism to transfer the token object to other of the plurality of computers.

9. The network of claim 8, wherein each of said plurality of computers further includes a virtual machine on which the remote object passing mechanism is implemented.

10. A method of updating a protocol for controlling a computer network comprising the steps of:
    receiving a token object at a first computer in the network;
    consulting the token object, and, when the token object indicates that a new protocol is to be used to transmit information on the network, updating an older version of the protocol stored at the first computer; and transmitting the token object to a second computer in the network, the second computer being determined based on information in the token object.

11. The method of claim 10, further including the step of introducing an updated version of the token object into the network.

12. The method of claim 11, wherein the step of introducing an updated version of the token object further includes the substep of defining a new token transmission order for the network.

13. The method of claim 10, wherein the step of transmitting the token object includes the substep of transmitting the token object using the Java remote invocation system.

14. A computer readable medium containing instructions for causing computers to update a protocol used to control a computer network, the instructions causing the computers to perform the steps of:

creating a token object containing methods defining an updated version of the protocol;

sequentially passing the token object to each of the computers; and updating the protocol used by each of the computers with the methods defining the updated version of the protocol while the token object is present at said each computer.

15. The computer readable medium of claim 14, wherein the instructions for causing the computers to perform the step of sequentially passing the token object to each of the computers includes the substep of introducing the token object to the computers by an authorized computer when the authorized computer is given control of a previous version of the token object.

16. The computer readable medium of claim 14, wherein the instructions for causing the computers to perform the step of sequentially passing the token object includes the substep of transmitting the token object using the Java remote invocation system.

17. The computer readable medium of claim 14, wherein the protocol carried out by the plurality of computers in the network implements a token ring computer network.

18. The computer readable medium of claim 14, wherein the instructions for causing the computers to perform the step of creating the token object containing methods defining an updated version of the protocol further includes the substep of defining a new token passing order for the network.

19. A method for updating a protocol in a network comprising the steps of:

receiving a token object containing a method defining a protocol of the network;

updating a protocol used by a computer using the protocol of the network defined in the received token object; and sending the token object.

20. The method of claim 19, wherein the receiving step includes the substep of receiving the token object at a first computer in the network and the sending step includes the substep of transmitting the object to a second computer in the network.

21. The method of claim 19, further including the step of sequentially sending the token object to each computer in the network.

22. The method of claim 19, further including the step of introducing an updated version of the token object into the network.

* * * * *

UNITED STATES PATENT AND TRADEMARK OFFICE
CERTIFICATE OF CORRECTION

PATENT NO. : 6,438,614 B2
DATED : August 20, 2002
INVENTOR(S) : Kenneth Arnold et al.

It is certified that error appears in the above-identified patent and that said Letters Patent is hereby corrected as shown below:

Title page,
After item [22], please add the following:

--         Related U.S. Application Data
[60]     Provisional application No. 60/076,048, filed on Feb. 26, 1998. --

Signed and Sealed this

Fourteenth Day of January, 2003

JAMES E. ROGAN
*Director of the United States Patent and Trademark Office*